US012617374B2

(12) United States Patent
Hitnalli et al.

(10) Patent No.: US 12,617,374 B2
(45) Date of Patent: May 5, 2026

(54) ADJUSTABLE BLADE LOAD MECHANISM FOR CANTILEVER BEAM WIPER ARM ASSEMBLY

(71) Applicant: Rosemount Aerospace Inc., Burnsville, MN (US)

(72) Inventors: Vishwanath Hitnalli, Bangalore (IN); Venkata Anilkumar Mothe, Bangalore (IN); Phani Srinivas Nouduri, Karnataka (IN)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 19/016,688

(22) Filed: Jan. 10, 2025

(65) Prior Publication Data

US 2025/0304015 A1 Oct. 2, 2025

(30) Foreign Application Priority Data

Mar. 26, 2024 (IN) .............................. 202441023932

(51) Int. Cl.
*B60S 1/36* (2006.01)
*B60S 1/34* (2006.01)
*F16F 1/22* (2006.01)

(52) U.S. Cl.
CPC .............. *B60S 1/36* (2013.01); *B60S 1/3429* (2013.01); *B60S 1/3443* (2013.01); *B60S 1/3445* (2013.01); *B60S 1/3475* (2013.01); *B60S 1/345* (2013.01); *F16F 1/22* (2013.01)

(58) Field of Classification Search
CPC .................. B60S 1/3425; B60S 1/3429; B60S 1/3445–3447; B60S 1/3443; B60S 1/3475; B60S 1/36; F16F 1/22
See application file for complete search history.

(56) References Cited

U.S. PATENT DOCUMENTS

| | | | |
|---|---|---|---|
| 1,573,618 A * | 2/1926 | Laganke | B60S 1/4064 |
| | | | 15/250.32 |
| 2,156,505 A | 5/1939 | Louis | |
| 2,392,670 A | 1/1946 | Horton | |
| 2,531,889 A | 11/1950 | Oishei et al. | |
| 2,806,241 A | 9/1957 | Oishei | |
| 3,122,770 A | 3/1964 | Krohm | |
| 2004/0060143 A1 | 4/2004 | Shuen | |
| 2023/0415702 A1* | 12/2023 | Machida | B60S 1/4009 |

FOREIGN PATENT DOCUMENTS

| | | | | |
|---|---|---|---|---|
| CN | 207481862 U | 6/2018 | | |
| GB | 2321845 A * | 8/1998 | ............ | B60S 1/3406 |

* cited by examiner

*Primary Examiner* — Matthew P Travers
(74) *Attorney, Agent, or Firm* — Kinney & Lange, P.A.

(57) ABSTRACT

A windshield wiper system has a drive arm with a drive shaft connector, a curved cantilever beam, and a wiper blade assembly. The drive arm is configured to connect to a drive shaft at the drive shaft connector. The curved cantilever beam is connected to the drive arm with a first drive arm fastener and a moveable drive arm fastener. The first drive arm fastener is positioned on the drive arm between the drive shaft connector and the moveable drive arm fastener. The wiper blade assembly is connected to the curved cantilever beam with a wiper blade fastener. The curved cantilever beam has an effective length extending from the moveable drive arm fastener to the wiper blade assembly fastener.

20 Claims, 4 Drawing Sheets

ADJUSTABLE BLADE LOAD MECHANISM FOR CANTILEVER BEAM WIPER ARM ASSEMBLY

CROSS-REFERENCE TO RELATED APPLICATION(S)

The aforementioned India Provisional Application No. 202441023932 filed Mar. 26, 2024, are hereby incorporated by reference in their entirety.

BACKGROUND

The present disclosure relates generally to windshield wiper systems and, more particularly, to windshield wiper systems having an adjustable blade load.

As well known, windshield wiper systems (WWS) are used in many applications to clear rain, frozen precipitation, dirt and other debris from windshield. A typical WWS includes a drive motor, drive shaft, drive arm/cantilever beam assembly, wiper blade assembly, and potentially an optional wash system. The blade assembly is held onto the windshield by a force exerted by the arm assembly known as "blade load." Blade load is an important design parameter that contributes to wipe quality. In a conventional WWS, the blade load exerted by arm assembly on the blade assembly can be adjusted with help of a spring mechanism, Belleville washers, and other designs.

SUMMARY

One aspect of this disclosure is directed to a windshield wiper system having a drive arm with a drive shaft connector, a curved cantilever beam, and a wiper blade assembly. The drive arm is configured to connect to a drive shaft at the drive shaft connector. The curved cantilever beam is connected to the drive arm with a first drive arm fastener and a moveable drive arm fastener. The first drive arm fastener is positioned on the drive arm between the drive shaft connector and the moveable drive arm fastener. The moveable drive arm fastener is positioned at one of a plurality of moveable drive arm fastening positions. The wiper blade assembly is connected to the curved cantilever beam with a wiper blade fastener positioned at a wiper blade assembly fastening position on an outboard tip of the curved cantilever beam. The curved cantilever beam has an effective length extending from the moveable drive arm fastener to the wiper blade assembly fastener such that a blade load exerted by the curved cantilever beam on the wiper blade assembly is a function of the effective length.

Another aspect of this disclosure is directed to a method of installing a windshield wiper system that includes connecting a drive shaft to a drive motor and connecting a drive arm to the drive shaft at a drive shaft connector. A curved cantilever beam is connected to the drive arm with a first drive arm fastener and a moveable drive arm fastener. The first drive arm fastener is positioned on the drive arm between the drive shaft connector and the moveable drive arm fastener. The moveable drive arm fastener is positioned at one of a plurality of moveable drive arm fastening positions. A wiper blade assembly is connected to the curved cantilever beam with a wiper blade fastener positioned at a wiper blade assembly fastening position on an outboard tip of the curved cantilever beam. The curved cantilever beam has an effective length extending from the moveable drive arm fastener to the wiper blade assembly fastener such that a blade load exerted by the curved cantilever beam on the wiper blade assembly is a function of the effective length.

DETAILED DESCRIPTION

Windshield wiper systems (WWS) are used in many applications, including terrestrial, nautical, and aerospace applications, to clear rain, frozen precipitation, dirt and other debris from windshields. Terrestrial applications include every type of motor vehicle, rail vehicles, etc. Nautical applications include every type of ship. Aerospace applications include every type of aircraft, including fixed wing and rotary wing aircraft.

As discussed above, blade load is an important design parameter that contributes to wipe quality. Some WWS, such as WWS using a cantilever beam wiper arm, do not typically include a contain blade load adjustment feature. Typically, blade load in such arms is only dependent on the cantilever beam design parameters such as the thickness, width, length, material, bend radius etc. of the cantilever beam. Including conventional methods of blade load adjustments (screws for springs, torquing Belleville washers etc.) can increase the aerodynamic drag on the wiper arms and increase the build complexity.

One additional important design parameter for cantilever beam wiper arms that impacts the blade load is the "effective length" of the cantilever beam. The "effective length" of the cantilever beam is the length between a fixed end of the cantilever beam and an outboard tip of the cantilever beam. As discussed in more detail below, a small change in the cantilever beam's effective length will significantly vary the blade load that the cantilever beam applies.

Figure 1A:
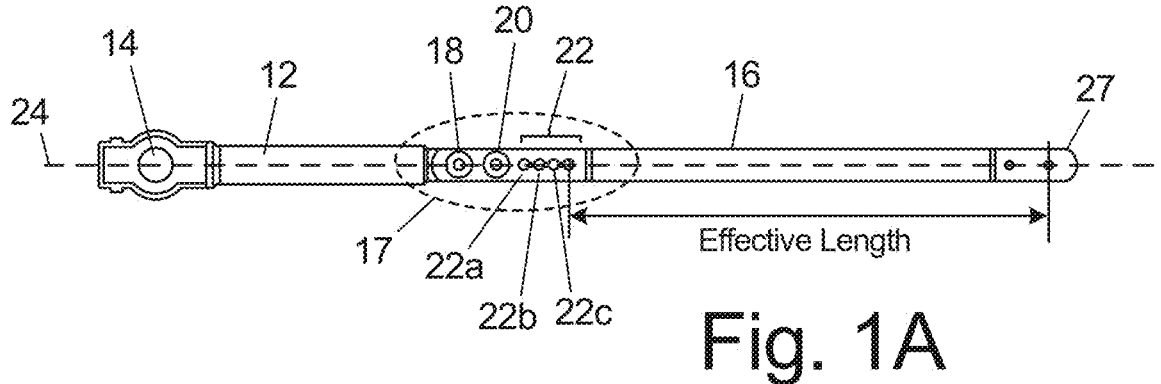
FIG. 1A is an overhead view of a windshield wiper system of this disclosure.

FIG. 1A is an overhead view of a windshield wiper system drive arm 12 connected to a curved cantilever beam 16 at a junction 17 with a first drive arm fastener 18 and a second drive shaft fastener 20. The drive arm 12 includes a drive shaft connector 14 that is configured to connect to a drive shaft 30 (see FIGS. 4, 6A, and 6B). Both the drive arm 12 and the curved cantilever beam 16 include a plurality of moveable drive arm fastening positions 22 that are configured to accept a moveable drive arm fastener (see FIGS. 1C, 4, 5A, 5B, 6A, and 6B) in one of the plurality of moveable drive arm fastening positions 22. While the drive arm 12 and the curved cantilever beam 16 may include any number of moveable drive arm fastening positions 22, FIG. 1A (and the other Figs. in this application) show four moveable drive arm fastening positions 22, a first position 22a, a second position 22b, a third position 22c, and a fourth position 22d. The first position 22a is closest to the first drive arm fastener 18, the second position 22b is between the first position 22a and the third position 22c, the third position 22c is between the second position 22b and the fourth position 22d, and the fourth position 22d is axially outboard of the first position 22a, the second position 22b, and the third position 22c. The drive shaft connector 14, the first drive arm fastener 18, second drive arm fastener 20, and plurality of moveable drive arm fastening positions 22 are aligned along an axis 24 that extends along the drive arm 12 and curved cantilever beam 16 from an axially inboard position at the drive shaft connector 14 to an axially outboard tip 27 on the curved cantilever beam 16. Although the drive shaft connector 14 is shown aligned with the first drive arm fastener 18, the second drive arm fastener 20, and the plurality of drive arm fastening positions 22 along the axis 24 in FIG. 1A, the drive shaft connector 14 may, optionally, not be aligned along the axis 24.

Figure 1B:
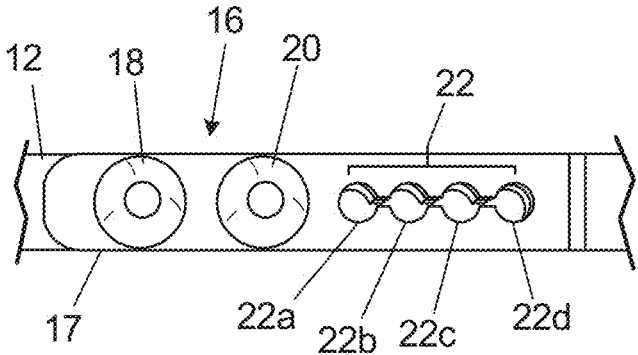
FIG. 1B is an overhead close-up view of the windshield wiper system junction of FIG. 1A.
Figure 1C:
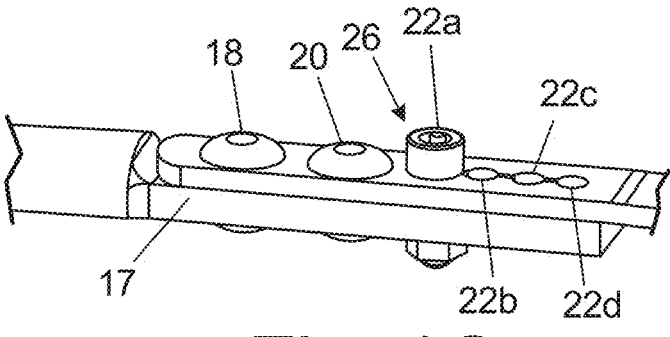
FIG. 1C is a perspective close-up view of the windshield wiper system arm junction of FIG. 1B.

FIG. 1B is an overhead close-up view of the junction 17 where the drive arm 12 is connected to a curved cantilever beam 16 with a first drive arm fastener 18 and a second drive shaft fastener 20. FIG. 1B depicts four moveable drive arm fastening positions 22, a first position 22a, a second position 22b, a third position 22c, and a fourth position 22d. FIG. 1C similarly depicts four moveable drive arm fastening positions 22, a first position 22a, a second position 22b, a third position 22c, and a fourth position 22d, with a moveable drive arm fastener 26 installed in the first position 22a. FIG. 1C depicts the first drive arm fastener 18 and a second drive shaft fastener 20 as rivets and the moveable drive arm fastener 26 as a nut and bolt. As discussed further below, a person of ordinary skill will understand that fasteners other than rivets can be used for the first drive arm fastener 18 and a second drive shaft fastener 20 and that fasteners other than a nut and bolt can be used for the moveable drive arm fastener 26.

Figure 2:
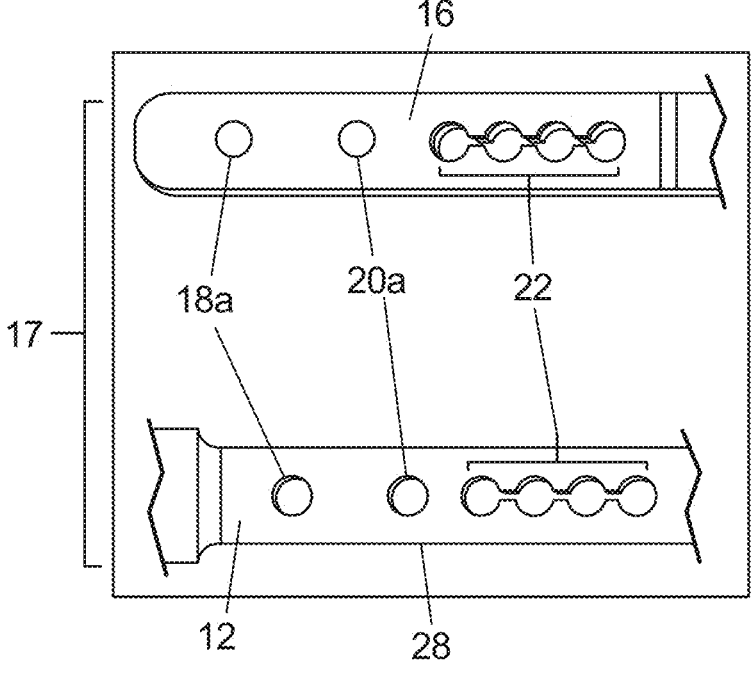
FIG. 2 is schematic exploded view of the windshield wiper system arm junction of FIGS. 1A-1C.
Figure 3:
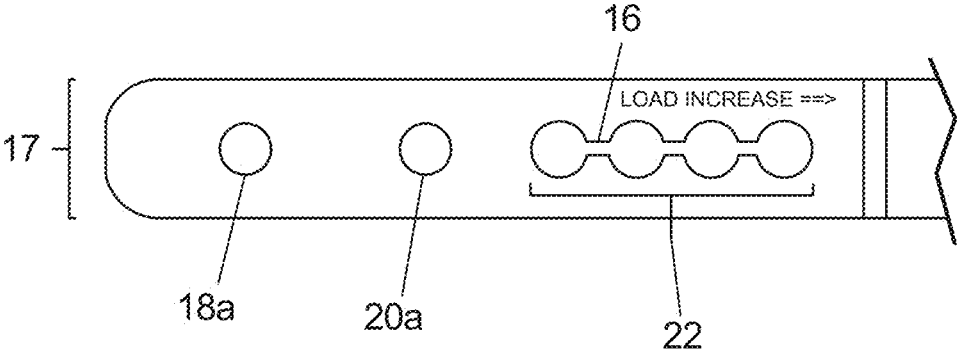
FIG. 3 is a view of an engraved junction of the cantilever beam of FIG. 2.

FIG. 2 is an exploded view of the junction 17 between the drive arm 12 and curved cantilever beam 16 that shows the drive arm 12 and curved cantilever beam 16 as separate components. This view shows the first drive arm fastener hole 18a, second drive fastener hole 20a, and four moveable drive arm fastening positions 22, a first position 22a, a second position 22b, a third position 22c, and a fourth position 22d in both the drive arm 12 and curved cantilever beam 16. FIG. 3 is a similar view of the junction 17 portion of the curved cantilever beam 16 showing the text "LOAD INCREASE==>" over the plurality of drive arm fastening positions 22 as a visual indicator that, as discussed in more detail below, moving the moveable drive arm fastener 26 axially outboard from the first position 22a increases the blade load exerted by the cantilever beam.

Figure 4:
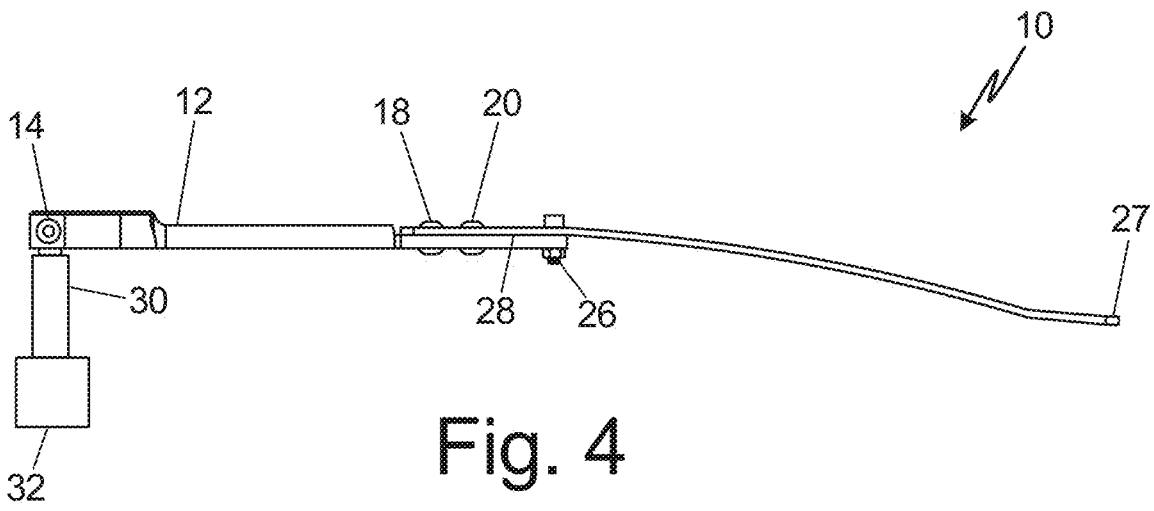
FIG. 4 is a side view of a windshield wiper system of this disclosure.

FIG. 4 shows the drive arm 12 connected drive shaft 30 at drive shaft connector 14. Drive shaft 30 is in turn connect to drive motor 32, which provides the motive force to move the windshield wiper system 10 when in operation (see also FIGS. 6A and 6B). A person of ordinary skill will know how to design the drive shaft 30 and drive motor 32 using known engineering considerations and the application for which the windshield wiper system 10 is designed. The drive arm 14 is further connected to the curved cantilever beam 16 at the junction 17. FIG. 4 depicts the first drive arm fastener 18 and a second drive arm fastener 20 as rivets and the moveable drive arm fastener 26 as a nut and bolt installed in the fourth position 22d. As person of ordinary skill will recognize that alternate fasteners can be used as the first drive arm fastener 18, the second drive arm fastener 20, and the moveable drive arm fastener 26 as long as the desired function of each fastener is achieved. For example, it might be desirable to have only one of the drive arm fastener 18 and the second drive arm fastener 20 to secure the curved cantilever beam 16 to the drive arm 14 and use the moveable drive arm fastener 26 to prevent rotation of the curved cantilever beam 16 with respect to the drive arm 14. In addition, any fastening device can be used instead of rivets for the first drive arm fastener 18 and a second drive arm fastener 20. Similarly, any fastening device that can be easily removed and fastened can be used instead of the nut and bolt for the moveable drive arm fastener 26.

The curved cantilever beam 16 extends over a top surface 28 of the drive arm 12, which as explained further below, allows the curved cantilever beam 16 to deliver a desired a desired blade load by adjusting the position of the moveable drive arm fastener 26 among the plurality of drive arm fastening positions 22. While moveable drive arm fastener 26 is shown as a nut and bolt, the nut and bolt can be supplemented with a lockwire or cotter pin (neither shown) or other anti-rotation device (e.g., lock washer, etc.) to prevent rotation and loosening/unthreading of the nut and bolt after installation.

Figure 5A:
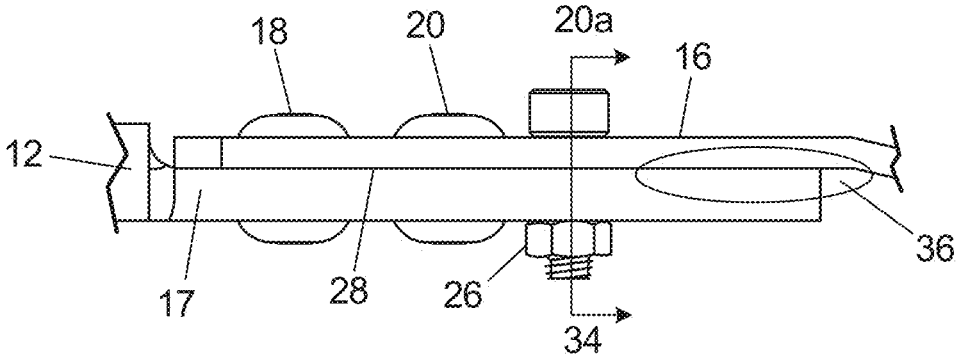
FIG. 5A is close-up side view of the windshield wiper system junction of FIG. 4.
Figure 5B:
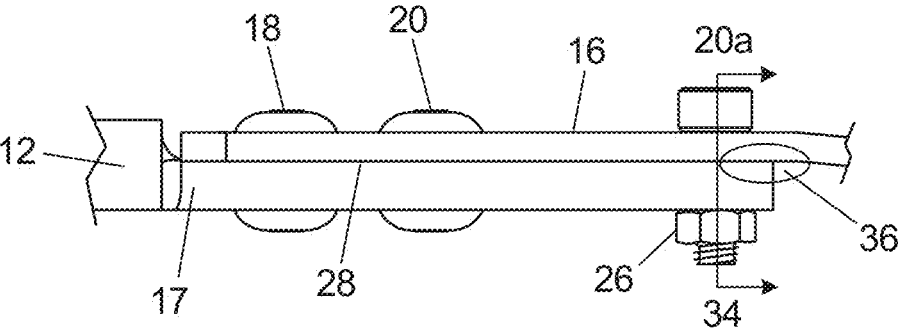
FIG. 5B is another close-up side view of the windshield wiper system junction of FIG. 4.

As shown in FIGS. 5A and 5B, the moveable drive arm fastener 26 can be installed anywhere among the plurality of drive arm fastening positions 22, for example at the first position 22a (FIG. 5A) or the fourth position 22d (FIG. 5B) based on the blade load requirement for a particular application or anticipated operational parameters. Installing the moveable drive arm fastener 26 at the first position 22a (FIG. 5A) results in a lower blade load then installing the moveable drive arm fastener 26 at the fourth position 22d (FIG. 5B). In all cases, the location of the moveable drive arm fastener 26 among the plurality of drive arm fastening positions 22 defines the effective length starting point 34 of the curved cantilever beam 16 as discussed further below. FIGS. 5A and 5B also shows the deflection 36 of the curved cantilever beam 16 axially outboard from the effective length starting point 34 and how the deflection 36 varies based on the effective length of the curved cantilever beam 16.

Figures 6A, 6B:
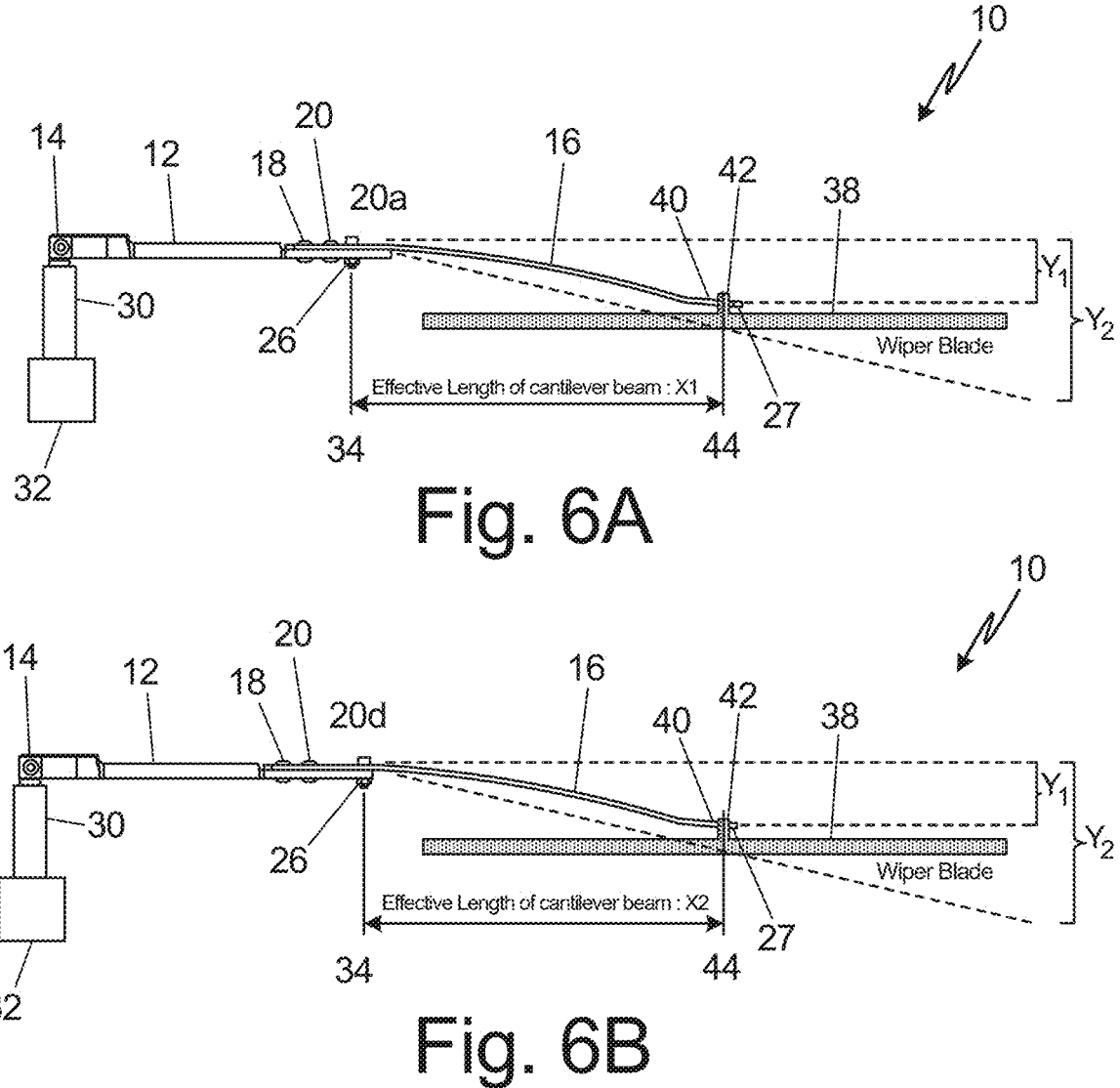
FIG. 6A is a side view of a windshield wiper system of this disclosure.
FIG. 6B is another side view of a windshield wiper system of this disclosure.

FIGS. 6A and 6B depict the entire windshield wiper system 10 including a wiper blade assembly 38, which is connected to the curved cantilever beam 16 with a wiper blade fastener 40 positioned at a wiper blade fastening position 42. The wiper blade fastening point 42 is located at an axial outboard tip 27 of the curved cantilever beam 16. As shown in FIGS. 6A and 6B, the effective length of the curved cantilever beam 16 is computed from the effective length starting point 34 at the location of the moveable drive arm fastener 26 to the effective length ending point 44 at the wiper blade fastener 40. FIGS. 6A and 6B also show two parameters $Y_1$ and $Y_2$ that are useful to calculate the blade load exerted by the curved cantilever beam 16. The parameter $Y_1$ reflects the deflection of the curved cantilever beam 16 under load and $Y_2$ reflects the deflection of the curved cantilever beam 16 when not loaded. Knowing the parameters $Y_1$ and $Y_2$, the blade load exerted by the curved cantilever beam 16 can be computed using the formula:

$$P = \frac{3EI\,Y}{L^3}$$

5 where:

P=the blade load exerted by the curved cantilever beam 16

E=Youngs Modulus of the curved cantilever beam 16

I=moment of inertia of the curved cantilever beam 16

$$Y = Y_2 - Y_1$$

L=the effective length of the curved cantilever beam 16 For a given curved cantilever beam 16, E, I and Y are constant, so $$P \alpha \frac{1}{L^3}.$$

As the blade load P exerted by the curved cantilever beam 16 is inversely proportional to cube of effective length L of the curved cantilever beam 16, a small change in the effective length L will result in a much larger increase in blade load P. For example, reducing the effective length L by moving the moveable drive arm fastener 26 from a first position 22*a* (or second position 22*b* or third position 22*c* to an axial outboard position (e.g., fourth position 22*d* or any position axially outboard of the initial position) will increase the blade load P exerted by the curved cantilever beam 16. Of course, the inverse is also true (i.e., moving the moveable drive arm fastener 26 axially inboard to reduce the blade load P). A designer knowing the blade loads P that are expected over a range of anticipated operating conditions for the windshield wiper system 10 can design the locations of the plurality of drive arm fastening positions 22 to accommodate variations in blade load P that might be desirable. A benefit of having the plurality of drive arm fastening positions 22 available to operators allow the blade load P to be varied while the windshield wiper system 10 is installed on its intended vehicle by moving the movable drive arm fastener one of the plurality of moveable drive arm fastening positions 22 to another of the plurality of moveable drive arm fastening positions 22 while the windshield wiper system 10 is installed on a vehicle.

A person of ordinary skill will appreciate that windshield wiper system 10 can be used for a variety of applications, including but not limited to terrestrial applications (e.g., every type of motor vehicle, rail vehicles, etc.), nautical applications (e.g., every type of ship or vessel), and aerospace applications (e.g., every type of aircraft, including fixed wing and rotary wing aircraft). At least for aerospace applications, it can be desirable to design the windshield wiper system 10 to be aerodynamically efficient to reduce drag related to the windshield wiper system 10 and to support desired operation of the windshield wiper system 10 with airflows associated with aircraft operation.

The windshield wiper system of this disclosure uses the plurality of drive arm fastening positions on the curved cantilever beam to provide a selectable blade load to accommodate various operational profiles for the windshield wiper system. The moveable drive arm fastener acts as a secondary structural support for the drive arm and curved cantilever level. In addition, the use of a nut and bolt as the moveable drive arm fastener is easy to implement because involves only tightening the nut and bolt and, optionally, installing an anti-rotation feature (e.g., a lockwire, cotter pin, lock washer, etc.).

6

Discussion of Possible Embodiments

The following are non-exclusive descriptions of possible embodiments of the present invention.

A windshield wiper system comprises a drive arm with a drive shaft connector, a curved cantilever beam, and a wiper blade assembly. The drive arm is configured to connect to a drive shaft at the drive shaft connector. The curved cantilever beam is connected to the drive arm with a first drive arm fastener and a moveable drive arm fastener. The first drive arm fastener is positioned on the drive arm between the drive shaft connector and the moveable drive arm fastener. The moveable drive arm fastener is positioned at one of a plurality of moveable drive arm fastening positions. The wiper blade assembly is connected to the curved cantilever beam with a wiper blade fastener positioned at a wiper blade assembly fastening position on an outboard tip of the curved cantilever beam. The curved cantilever beam has an effective length extending from the moveable drive arm fastener to the wiper blade assembly fastener such that a blade load exerted by the curved cantilever beam on the wiper blade assembly is a function of the effective length.

The windshield wiper system of the preceding paragraph can optionally include, additionally and/or alternatively, any one or more of the following features, configurations and/or additional elements:

The windshield wiper system of the preceding paragraph, wherein the first drive arm fastener is positioned in a fixed position on the drive arm and the curved cantilever blade.

The windshield wiper system of the preceding paragraph, further comprising a second drive arm fastener to secure the curved cantilever beam to the drive arm.

The windshield wiper system of the preceding paragraph, wherein the first drive arm fastener and the second drive arm fastener are rivets.

The windshield wiper system of any of the preceding paragraphs, wherein the moveable drive arm fastener comprises a nut and bolt.

The windshield wiper system of any of the preceding paragraphs, wherein the plurality of moveable drive arm fastening positions includes a first position, a second position, a third position, and a fourth position, wherein the first position is closest to the first drive arm fastener, the second position is between the first position and the third position, the third position is between the second position and the fourth position, and the fourth position is axially outboard of the first position, the second position, and the third position.

The windshield wiper system of the preceding paragraph, wherein the moveable drive arm fastener is positioned in the first position.

The windshield wiper system of the preceding paragraph, wherein the moveable drive arm fastener is positioned in the fourth position.

The windshield wiper system of any of the preceding paragraphs, wherein the movable drive arm fastener is configured to be moved from one of the plurality of moveable drive arm fastening positions to another of the plurality of moveable drive arm fastening positions while the windshield wiper system is installed on a vehicle.

The windshield wiper system of the preceding paragraph, wherein the vehicle is configured for use in terrestrial applications.

The windshield wiper system of the preceding paragraph, wherein the vehicle is configured for use in nautical applications.

The windshield wiper system of the preceding paragraph, wherein the vehicle is configured for use in aerospace applications.

A method of installing a windshield wiper system comprises connecting a drive shaft to a drive motor and connecting a drive arm to the drive shaft at a drive shaft connector. A curved cantilever beam is connected to the drive arm with a first drive arm fastener and a moveable drive arm fastener. The first drive arm fastener is positioned on the drive arm between the drive shaft connector and the moveable drive arm fastener. The moveable drive arm fastener is positioned at one of a plurality of moveable drive arm fastening positions. A wiper blade assembly is connected to the curved cantilever beam with a wiper blade fastener positioned at a wiper blade assembly fastening position on an outboard tip of the curved cantilever beam. The curved cantilever beam has an effective length extending from the moveable drive arm fastener to the wiper blade assembly fastener such that a blade load exerted by the curved cantilever beam on the wiper blade assembly is a function of the effective length.

The method of the preceding paragraph can optionally include, additionally and/or alternatively, any one or more of the following features, configurations and/or additional elements:

The method of the preceding paragraph, wherein the first drive arm fastener is positioned in a fixed position on the drive arm and the curved cantilever blade.

The method of the preceding paragraph, further comprising a second drive arm fastener to secure the curved cantilever beam to the drive arm.

The method of the preceding paragraph, wherein the first drive arm fastener and the second drive arm fastener are rivets.

The method of any of the preceding paragraphs, wherein the moveable drive arm fastener comprises a nut and bolt.

The method of any of the preceding paragraphs, wherein the plurality of moveable drive arm fastening positions includes a first position, a second position, a third position, and a fourth position, wherein the first position is closest to the first drive arm fastener, the second position is between the first position and the third position, the third position is between the second position and the fourth position, and the fourth position is axially outboard of the first position, the second position, and the third position.

The method of the preceding paragraph, wherein the moveable drive arm fastener is positioned in the first position.

The method of any of the preceding paragraphs, wherein the movable drive arm fastener is configured to be moved from one of the plurality of moveable drive arm fastening positions to another of the plurality of moveable drive arm fastening positions while the windshield wiper system is installed on a vehicle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A windshield wiper system comprising:
   a drive arm having a drive shaft connector, wherein the drive arm is configured to connect to a drive shaft at the drive shaft connector;
   a curved cantilever beam connected to the drive arm with a first drive arm fastener and a moveable drive arm fastener, wherein the first drive arm fastener is a rivet positioned on the drive arm between the drive shaft connector and the moveable drive arm fastener and wherein the moveable drive arm fastener is positioned at one of a plurality of moveable drive arm fastening positions located on the drive arm such that the moveable drive arm fastener functions as a blade load adjustment feature; and
   a wiper blade assembly connected to the curved cantilever beam with a wiper blade fastener positioned at a wiper blade assembly fastening position on an outboard tip of the curved cantilever beam;
   wherein the curved cantilever beam has an effective length extending from the location of the moveable drive arm fastener on the drive arm to the wiper blade assembly fastener such that a blade load exerted by the curved cantilever beam on the wiper blade assembly is a function of the effective length of the curved cantilever beam and the location of the moveable drive arm fastener on the drive arm is selected to provide a selected blade load.

2. The windshield wiper system of claim 1, wherein the first drive arm fastener is positioned in a fixed position on the drive arm and the curved cantilever beam.

3. The windshield wiper system of claim 2, further comprising a second drive arm fastener to secure the curved cantilever beam to the drive arm.

4. The windshield wiper system of claim 3, wherein the second drive arm fastener is a rivet.

5. The windshield wiper system of claim 1, wherein the moveable drive arm fastener comprises a nut and bolt.

6. The windshield wiper system of claim 1, wherein the plurality of moveable drive arm fastening positions includes a first position, a second position, a third position, and a fourth position, wherein the first position is closest to the first drive arm fastener, the second position is between the first position and the third position, the third position is between the second position and the fourth position, and the fourth position is axially outboard of the first position, the second position, and the third position.

7. The windshield wiper system of claim 6, wherein the moveable drive arm fastener is positioned in the first position.

8. The windshield wiper system of claim 6, wherein the movable drive arm fastener is positioned in the fourth position.

9. The windshield wiper system of claim 1, wherein the movable drive arm fastener is configured to be moved from one of the plurality of moveable drive arm fastening positions to another of the plurality of moveable drive arm fastening positions while the windshield wiper system is installed on a vehicle.

10. The windshield wiper system of claim 9, wherein the vehicle is configured for use in terrestrial applications.

11. The windshield wiper system of claim 9, wherein the vehicle is configured for use in nautical applications.

12. The windshield wiper system of claim 9, wherein the vehicle is configured for use in aerospace applications.

13. A method of installing a windshield wiper system, comprising:

connecting a drive shaft to a drive motor;

connecting a drive arm to the drive shaft at a drive shaft connector;

connecting a curved cantilever beam to the drive arm with a first drive arm fastener and a moveable drive arm fastener, wherein the first drive arm fastener is a rivet positioned on the drive arm between the drive shaft connector and the moveable drive arm fastener and wherein the moveable drive arm fastener is positioned at one of a plurality of moveable drive arm fastening positions located on the drive arm such that the moveable drive arm fastener functions as a blade load adjustment feature; and connecting a wiper blade assembly to the curved cantilever beam with a wiper blade fastener positioned at a wiper blade assembly fastening position on an outboard tip of the curved cantilever beam;

wherein the curved cantilever beam has an effective length extending from the moveable drive arm fastener to the wiper blade assembly fastener such that a blade load exerted by the curved cantilever beam on the wiper blade assembly is a function of the effective length of the curved cantilever beam and the location of the moveable drive arm fastener on the drive arm is selected to provide a selected blade load.

14. The method of claim 13, wherein the first drive arm fastener is positioned in a fixed position on the drive arm and the curved cantilever beam.

15. The method of claim 14, further comprising a second drive arm fastener to secure the curved cantilever beam to the drive arm.

16. The windshield wiper system of claim 3, wherein the second drive arm fastener is a rivet.

17. The method of claim 13, wherein the moveable drive arm fastener comprises a nut and bolt.

18. The method of claim 13, wherein the plurality of moveable drive arm fastening positions includes a first position, a second position, a third position, and a fourth position, wherein the first position is closest to the first drive arm fastener, the second position is between the first position and the third position, the third position is between the second position and the fourth position, and the fourth position is axially outboard of the first position, the second position, and the third position.

19. The method of claim 18, wherein the moveable drive arm fastener is positioned in the first position.

20. The method of claim 13, wherein the movable drive arm fastener is configured to be moved from one of the plurality of moveable drive arm fastening positions to another of the plurality of moveable drive arm fastening positions while the windshield wiper system is installed on a vehicle.

* * * * *